H. J. LUEDERS.
APPARATUS FOR TREATING BREAD.
APPLICATION FILED FEB. 12, 1918.

1,282,252.

Patented Oct. 22, 1918.

Inventor
Henry J. Lueders
By Robertson & Johnson
Attorneys

UNITED STATES PATENT OFFICE.

HENRY J. LUEDERS, OF WASHINGTON, DISTRICT OF COLUMBIA, ASSIGNOR OF ONE-HALF TO FRED TREULEBEN, OF WASHINGTON, DISTRICT OF COLUMBIA.

APPARATUS FOR TREATING BREAD.

1,282,252.   Specification of Letters Patent.   Patented Oct. 22, 1918.

Application filed February 12, 1918. Serial No. 216,733.

*To all whom it may concern:*

Be it known that I, HENRY J. LUEDERS, a citizen of the United States of America, and a resident of Washington, in the District of Columbia, have invented certain new and useful Improvements in Apparatus for Treating Bread, of which the following is a specification.

This invention relates to apparatus for treating bread after it is baked and just prior to its wrapping. Under the present methods of baking bread it is usual to allow the bread, after being baked, to cool on iron racks from four to six hours before it is wrapped. During this time it is consequently exposed to the atmosphere from which are deposited onto the tops of the loaves a large number of fungoid bacteria known as molds. After the bread is wrapped and the crust of the bread commences to soften these molds begin to grow, at first on the surface of the bread and then gradually into the loaves through any splits or openings that may be in them. The molds cannot withstand a high temperature and the object of my invention is to provide apparatus for treating the molds to a temperature of between 140° and 600° F. so that the molds will be destroyed immediately prior to the wrapping of the bread. My invention therefore consists in the apparatus, shown in its preferable embodiment in the accompanying drawings in which:

Figure 1:
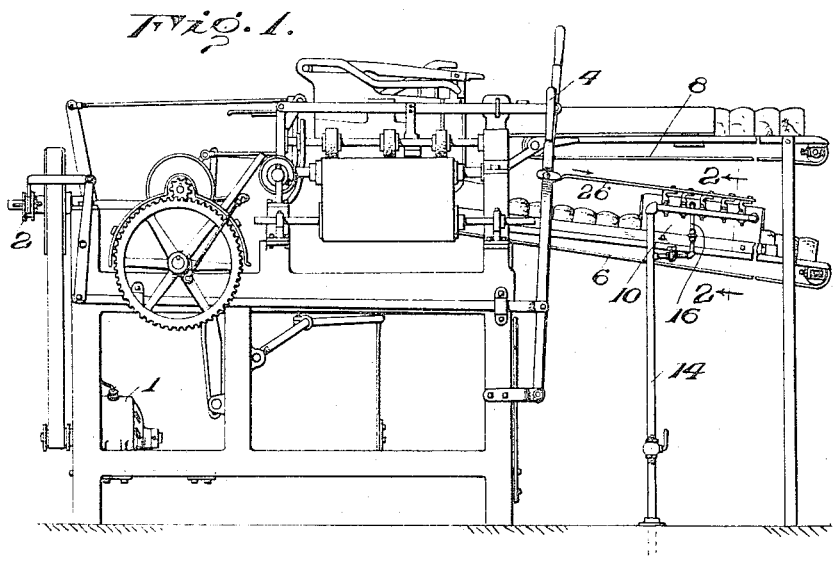
Figure 1 is a side elevation of a machine now in common use, with apparatus connected therewith to carry out my invention.
Figure 2:
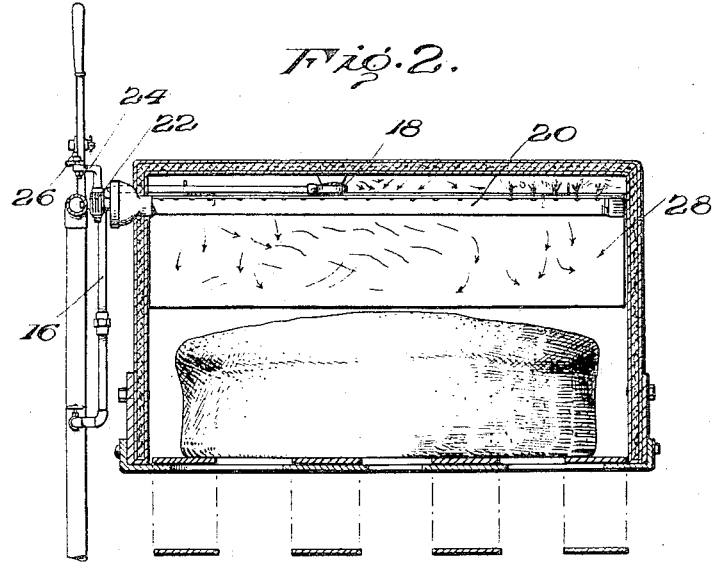
Fig. 2 is a sectional view of one of the sterilizers.

In the aforesaid drawing the machine, as shown in Fig. 1, comprises a wrapping machine to which power is applied by a motor 1 through a clutch 2 which is operated from a clutch lever 4. Connected to one side of the machine is an endless apron 6 by which loaves are delivered to the machine to be wrapped, and the loaves after having been wrapped are delivered by another endless apron 8. It will be understood that my invention has nothing to do with the form of wrapping machine but that the machine shown in the drawing is used for the purpose of illustration only. In carrying out my invention, I prefer to employ a sterilizer which may, if desired, be located at the point 10 so that as the loaves of bread are moved by the aforesaid endless carrier 6 into the wrapping machine, they are transported through the sterilizer. A sectional view of this sterilizer is shown in Fig. 2. The sterilizer is preferably of the size to contain, say, six loaves of bread at once and it is provided with means for heating it, one form of which will now be described. A gas supply pipe 14 is preferably employed from which runs a pipe 16 to supply gas to a pilot burner 18. The main pipe 14 also supplies a number of burners such as that shown at 20 in Fig. 2, these burners extending laterally across the sterilizer for the whole width of the same, the width being preferably slightly in excess of the loaves of bread being treated. Each of the burners 20 is provided with a valve 22 and each valve is provided with a crank 24, all of these cranks being connected to a common link 26 which in turn is connected to the clutch operating lever 4 hereinbefore described. It will be obvious from this construction that when the clutch lever 4 is moved in one direction to throw the clutch to start the machine in motion, all of the valves 22 will be moved to permit the gas to flow to the various burners 20, these burners being lighted from the constantly burning pilot burner 18. It will also be manifest that when the clutch lever 4 is thrown to shift the clutch to stop the machine, the valves will be moved in the contrary direction and therefore closed so that the supply of gas is shut off from all the burners except the pilot burner 18.

The aforesaid burners 20 are designed to provide heat preferably above 140° F. The invention is of course not limited to any special temperature, for I find that temperatures from 140° to 600° F. will effectively kill all the molds that have lodged on the bread during the cooling and will make the bread absolutely sterile and immune from further mold growths. The sterilizers are preferably formed with double walls as shown in Fig. 2 and lined with asbestos. They may also be provided with swinging doors 28 which are about the height of the loaves to be wrapped and their purpose is to keep the heat in the chamber.

In operation, when the operator throws the starting lever 4 to move the clutch to operative position, the wrapping machine is started and simultaneously all the burners 20 are lighted from the pilot burner so that as the loaves of bread are fed by the endless apron 6 into the wrapping machine to be wrapped, they pass through the sterilizer and are subjected to the heat from the burners 20, thereby killing all molds that have lodged on the bread during the cooling, the bread being immediately passed from the sterilizer into the wrapping machine to be wrapped and discharged therefrom by the discharge apron 8.

This application is a division of my application Ser. No. 203,413, filed Nov. 22, 1917, for method of treating bread, the present application covering apparatus for carrying out the method disclosed by said application Ser. No. 203,413.

It will be obvious that modifications may be made in the form and construction of the apparatus shown in the drawings and that any form of wrapping machine may be employed, and that other forms of heat may be used if desirable. Therefore reference should be made to the appended claims to determine the scope of the invention.

What I claim as my invention is:

1. In apparatus for wrapping loaves of bread, the combination of a wrapping machine, means for feeding the bread thereto, and a sterilizer arranged to act upon the crust of the loaves as they are fed by such feeding means, substantially as described.

2. In apparatus of the character described, the combination of a wrapping machine, a sterilizer, means for passing the bread through said sterilizer and into the wrapping machine, said sterilizer arranged to heat the crust of the bread as it passes therethrough, and connections between the wrapping machine and the heating means for controlling the supply of heat simultaneously with the control of the operation of the machine, substantially as described.

3. In apparatus of the character described, the combination of a wrapping machine, a sterilizer, means for passing the bread through said sterilizer and into the wrapping machine, said sterilizer arranged to heat the crust of the bread as it passes therethrough, a lever for starting and stopping the wrapping machine, and connections between said lever and the heating means whereby the wrapping machine and the heating means are controlled by the movement of the same lever, substantially as described.

In testimony whereof I affix my signature in presence of two witnesses.

HENRY J. LUEDERS.

Witnesses:
JOHN L. FLETCHER,
THOMAS E. ROBERTSON.